Fig. 1.

INVENTOR.
Charles G. Burton
BY Popp and Sommer
ATTORNEYS.

Fig. 2.

Feb. 18, 1969  C. G. BURTON  3,427,794
MOBILE CUCUMBER HARVESTER

Filed Oct. 20, 1965  Sheet 4 of 8

INVENTOR.
Charles G. Burton
BY
Popp and Sommer
ATTORNEYS.

Feb. 18, 1969 C. G. BURTON 3,427,794
MOBILE CUCUMBER HARVESTER
Filed Oct. 20, 1965 Sheet 7 of 8

Fig. 12.

INVENTOR.
Charles G. Burton
BY
Pipp and Sommer
ATTORNEYS.

United States Patent Office 3,427,794
Patented Feb. 18, 1969

3,427,794
MOBILE CUCUMBER HARVESTER
Charles G. Burton, Lewiston, N.Y., assignor to Chisholm-Ryder Company, Inc., Niagara Falls, N.Y., a corporation of New York
Filed Oct. 20, 1965, Ser. No. 498,886
U.S. Cl. 56—327                           10 Claims
Int. Cl. A01d 45/22

ABSTRACT OF THE DISCLOSURE

A mobile cucumber harvester is disclosed which gently lifts and handles cucumber laden vines so as to enable cucumbers of the desired size to be harvested and thereafter gently lays the vines back on the ground, this all occurring while the harvester is being moved through a field.

---

This invention relates to a machine for harvesting cucumbers in the field and is an improvement on the type of Cucumber Harvesting Machine described in the Lloyd Gilbert Patent 2,983,193 granted July 7, 1959.

Cucumbers grow and develop on vines which extend along the ground, and it has become general practice to train these vines in herringbone fashion along an angle of approximately 45° with reference to each row. The function of the present harvester is to move along these rows without disturbing the general arrangement of the vines and to remove all of the cucumbers in excess of a certain size without causing damage to vines, leaf structure, or to the remaining cucumbers which are left to more fully mature for subsequent harvesting. In machines of the type to which the present invention relates, the picking operation involves the gentle elevation of the vines without disturbing the root, and passing picking equipment underneath the elevated vines so that pendant cucumbers are removed and conveyed to a collecting point on the harvester.

The picking mechanism provided by this invention involves the relatively rapid movement of a series of picking bars on which the elevated vines are supported so that the cucumbers drop by gravity among the bars with the result that the bars strike the cucumbers and knock or comb them from the vines. The speed of movement of the strinking members can be selected to determine the maximum size of cucumber to be harvested. As a cucumber proceeds to maturity it progressively increases in size and hence is more vulnerable to the striking action of the picking bars against the stems or stem end thereof. As a result, a selected speed of picking bar movement will tend to remove cucumbers in excess of a particular desired size, and an increase in this speed will result in removing smaller cucumbers. Preferably the vine elevating and cucumber picking mechanism is carried by a harvester frame supported by a farm tractor and preferably in the form of counterpart vine lifting and cucumber picking mechanisms pivotally supported on the harvester frame at opposite sides of the tractor so that the lifting and picking mechanisms can be adjusted vertically. Such vertical adjustability can accommodate the machine for various conditions such as softness and contour of the ground, and type and age of the vines.

Another peculiarity of cucumber growing is the tendency of the vine to develop a so-called crown cucumber, this developing on a vine close to the root. Unless this particular cucumber is removed a disproportionate amount of the development activity of the vine is directed to increasing the size and maturing this crown cucumber to the detriment of all of the other cucumbers on the vine. Accordingly, it becomes important to harvest this crown cucumber, not only because it is the largest but also because its presence tends to retard the development of all of the other cucumbers.

An important object of the invention is to provide improved means for separating the cucumbers from the vines and gathering the harvested cucumbers, the improvement being in point of harvesting and gathering of the maximum of selected size of cucumbers, minimum injury, to the vines and undersize cucumbers left thereon, and increase in capacity to enable faster movement of the harvester through the field. This has been achieved by arranging the upper stretch of the spaced picking bars to travel upwardly and away from the root ends of the vines being harvested at an angle to the horizontal of from about 10° to about 12°, this angle having been found critical to these ends. To this end, a plurality of endless cucumber gathering belts also are arranged to have their upper stretches travel below this upper stretch of the spaced picking bars and to travel generally parallel therewith and hence the same critical angle of from about 10° to about 12° to the horizontal.

Another aim is to provide a simple articulated mounting for the vertically adjustable frame carrying the picking bars which permits vertical movement of the end of the frame adjacent the cucumber roots while at the same time maintaining this critical angle of from about 10° to amout 12° of the upper stretch of the picking bars.

Another purpose is to provide a lifting mechanism which gently lifts the laden vines from the ground without substantial loss of cucumbers and deposits them on the upper stretch of the picking bars, this being accomplished by a rubber fingered conical rotor lifting the vines from the ground, scrapers at the crest of this rotor, and a transfer roller generally parallel with this crest and between this crest and the upper stretch of picking bars.

Another object is to provide a harvester which gently lifts the laden vines, picks the cucumbers therefrom, and redeposits the vines on the ground and in which uprooting of the plants, because of being trampled on by the harvester wheels while being lifted, is prevented, this being achieved by cutting of the vine extremities which pass under the wheels.

Another object is to pick the so-called crown cucumbers growing at the root ends of the vines and which, if not picked, tend to sap a disproportionate amount of productive energy from the plant to the detriment of the other cucumbers of the plant. Such picking of these cucumbers at the roots of the vines is effected by arranging the picking bars to move upwardly under the root ends of the vines to strike such cucumbers from below, and also to provide a unique row of spring fingers which have fixed mounting at one end with reference to the harvester frame and are positioned and shaped to travel under the root ends of the vines and lift them to enable the picking bars to deliver an unimpeded upward blow against the crown cucumber or cucumbers on the root ends of the vines.

Another object is to provide such a harvester having a pair of counterpart gentle vine lifting, cucumber harvesting and vine redepositing mechanisms severally on frames which travel along opposite sides of the row being harvested and which are mounted to float vertically, this being achieved by mounting these frames on chains supported on the main frame of the harvester and leading to a common spring through which they are simultaneously adjusted as to effective length.

Another object is to provide means adjacent the gathering belts for straightening or alining the cucumbers in generally parallel arrangement.

Another object is to provide such a harvester having at the side of its main frame counterpart vine lifting, cucumber harvesting, and vine redepositing mechanisms carried by separate frames and in which the elevation of these separate frames relative to the main frame can be easily adjusted.

TRACTOR AND POWER TAKE-OFF

The cucumber harvester embodying the present invention can be self propelled in any suitable manner, but is shown in FIGS. 1–5 as carried by the chassis 25 and large rear drive wheels 26 of a conventional farm tractor 28, the tractor having a manned steering wheel 30 driven by a driver seated on a tractor seat 31. This part of the tractor chassis and its rear wheels are shown in broken lines. This manned steering wheel 30 steers front steering wheels supporting the front end of the harvester frame as hereinafter described.

Figure 4:
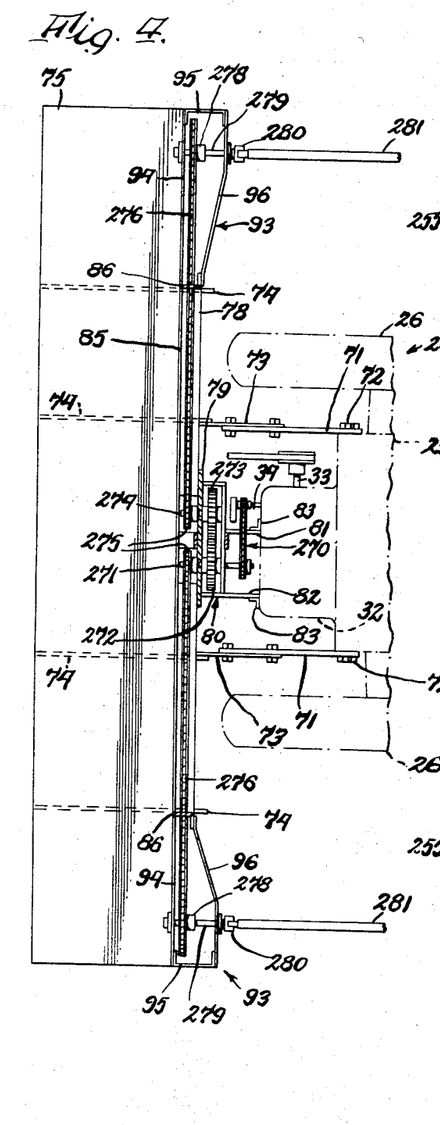
FIG. 4 is a fragmentary horizontal sectional view taken on line 4—4 of FIG. 1, and illustrating the rear platform and also the drive for the vine elevating and cucumber harvesting mechanisms.
Figure 5:
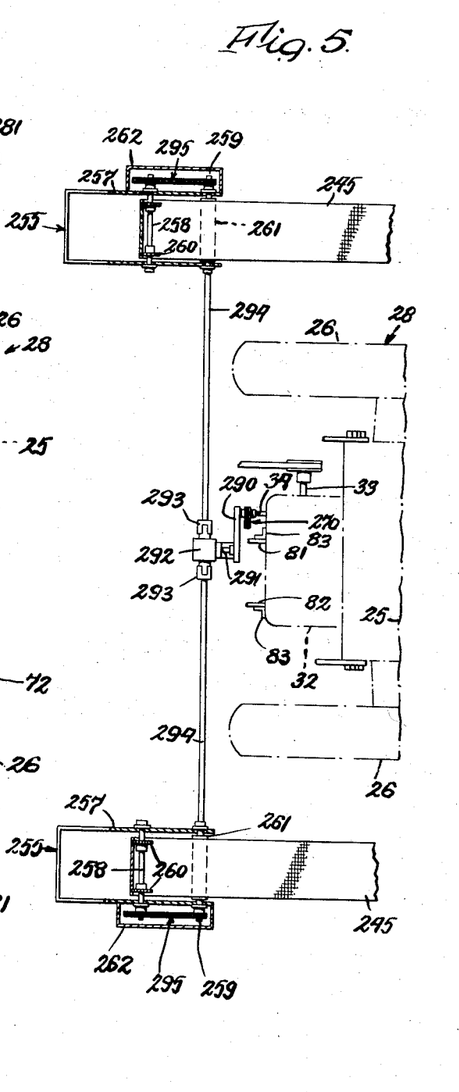
FIG. 5 is a fragmentary horizontal section taken on line 5—5, FIG. 1 and showing the drive for the side conveyor belts.

As best shown in FIGS. 4 and 5, the tractor chassis 25 has a gear box 32 at its rear end from the side of which a first power take-off shaft 33 protrudes and from the rear end of which a second power-take-off shaft 34 protrudes.

Figure 1:
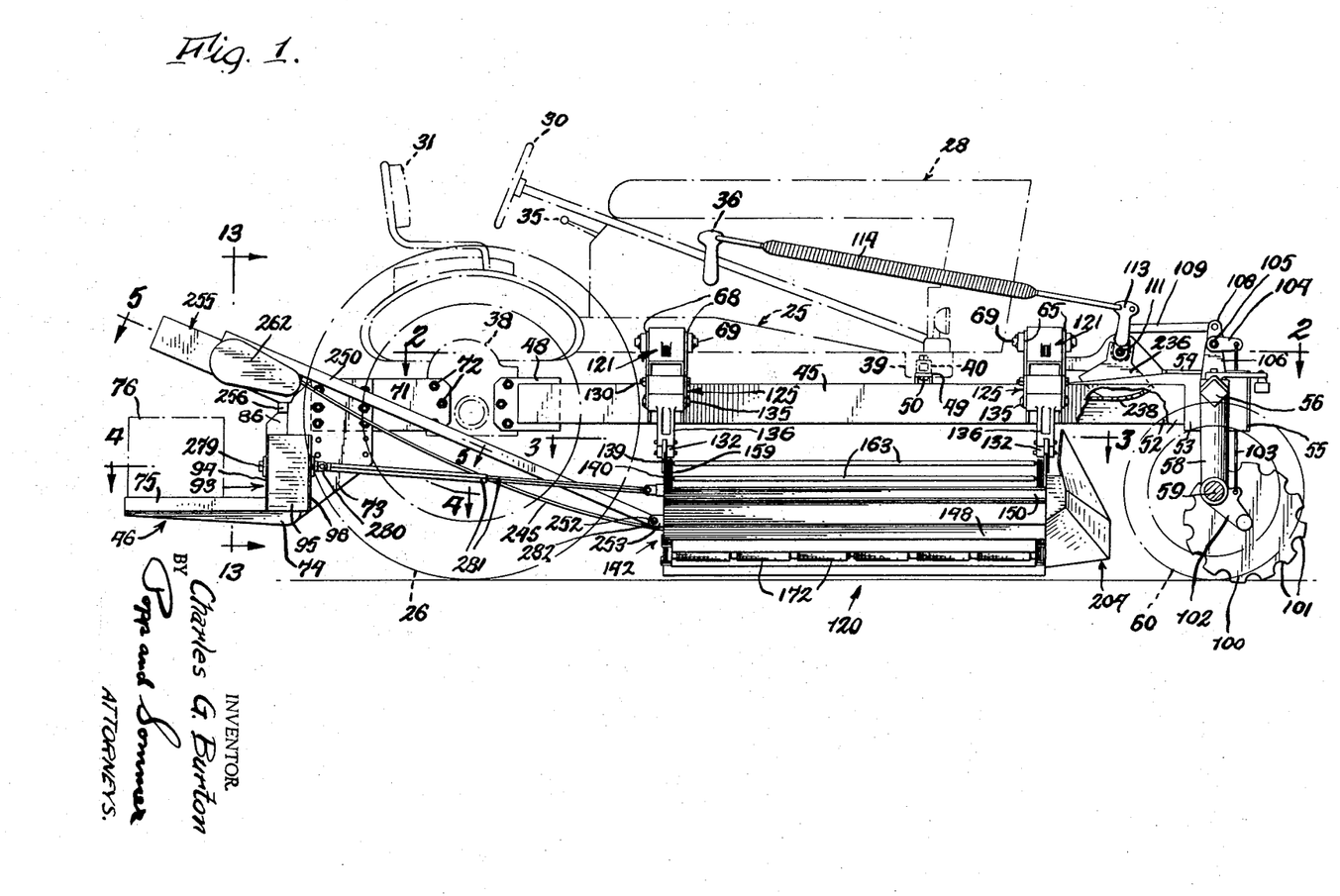
FIG. 1 is a side elevational view of a cucumber harvester illustrating, in dotted lines, a conventional farm tractor for propelling the same.

The tractor 26 also has a hand lever 35, FIG. 1, near the manual steering wheel 30, and which actuates an upstanding lever arm 36 to swing it forwardly and rearwardly, this lever arm preferably being power actuated from the operator's hand lever 35.

Figure 2:
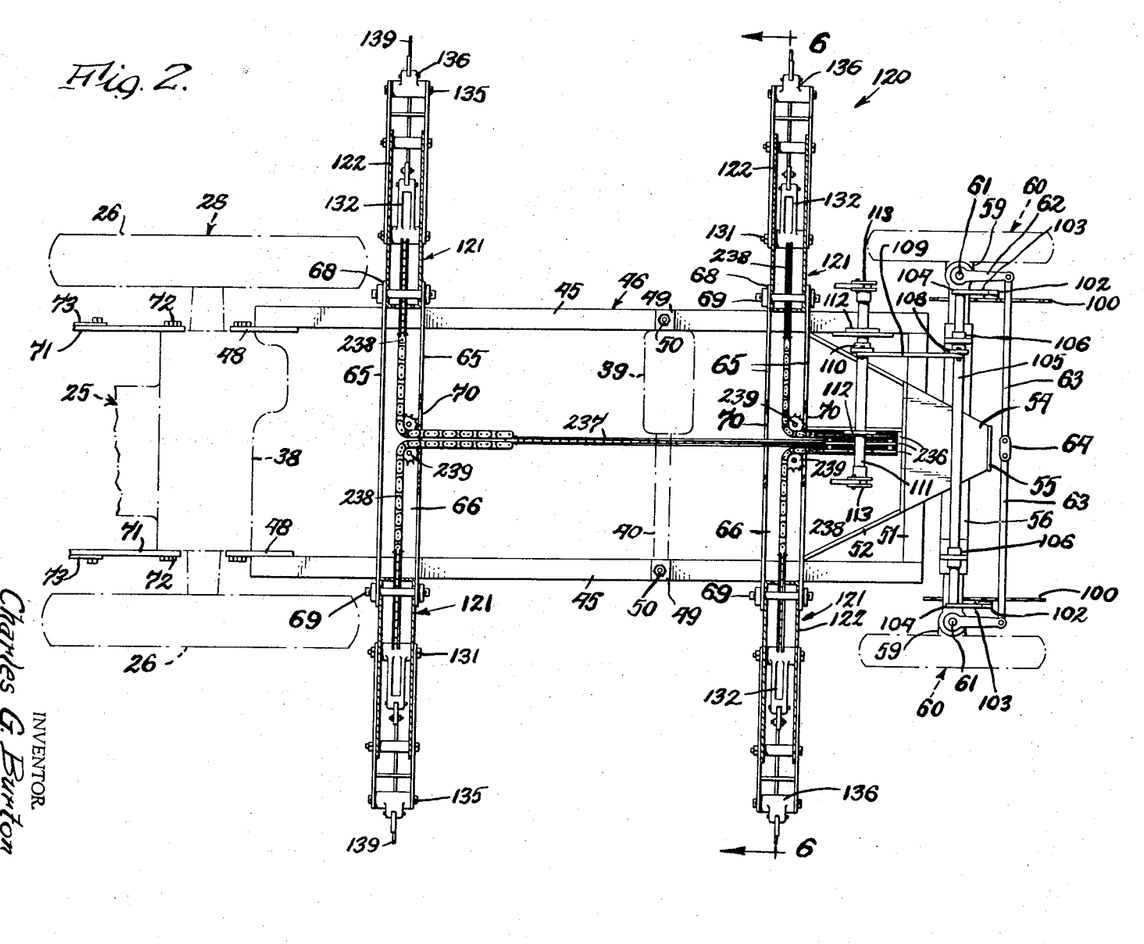
FIG. 2 is a horizontal sectional view taken generally on line 2—2, FIG. 1, and indicating a part of the spring-and-chain mechanism for raising and lowering the side frames for the counterpart vine lifting and cucumber harvesting mechanisms and providing a floating mounting for these side frames.

The tractor chassis 25 also includes a rear axle housing 38, FIG. 2, and a downwardly protruding part 39 at its forward end. This underpart 39 has fixed thereto a horizontal transverse square bar 40 projecting from the opposite sides thereof.

HARVESTER FRAME AND FRONT STEERING WHEELS

Figure 6:
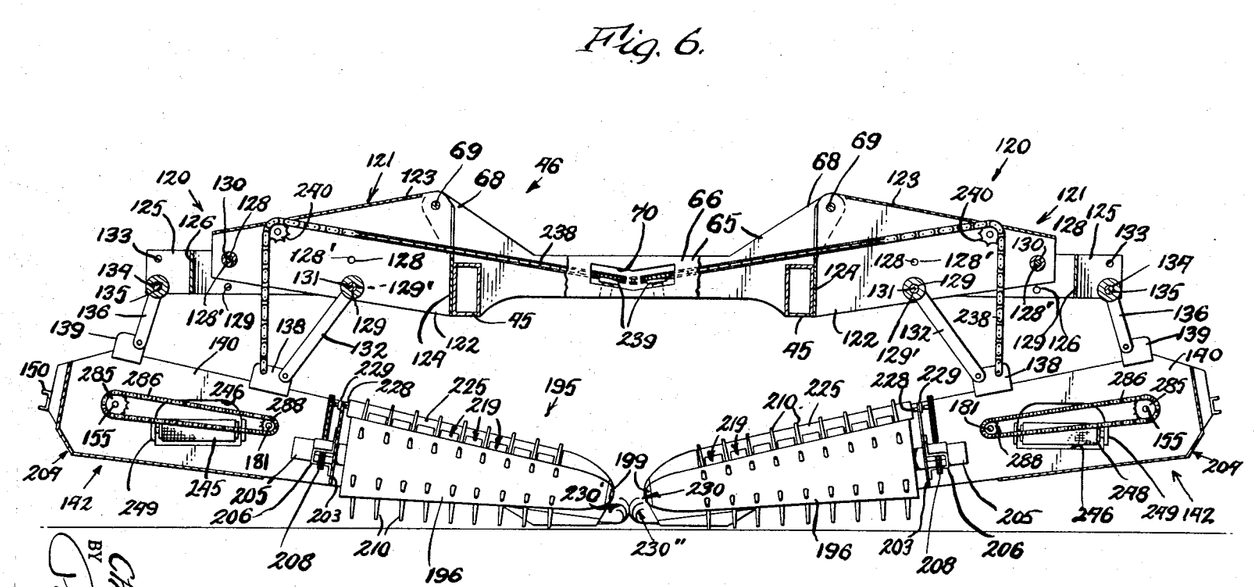
FIG. 6 is an enlarged transverse vertical section taken generally on line 6—6 of FIG. 2 and illustrating the counterpart vine lifting and cucumber harvesting mechanisms.

This rear axle housing 38 and downwardly protruding front part 39 of the harvester frame 25 carry the main longitudinal side bars 45 of the harvester frame 46, this being shown as of tubular rectangular form in cross section as shown in FIG. 6. As best shown in FIGS. 1 and 2 the rear end of each of these main longitudinal side frame bars 45 is bolted to the rear axle housing 38 through an upright plate 48 welded to the frame bar. The forward end of each of these main longitudinal side frame bars 45 is provided with an upstanding bracket 49 secured by a bolt 50 to the corresponding end of the square cross bar 40 of the tractor chassis 25.

As best shown in FIGS. 1 and 2, the forward ends of the main longitudinal side frame bars 45 are connected by a cross beam 51 and forwardly converging upright plates 52 each have their rear end connected to a main longitudinal side frame bar 45 and its forward end extending over and secured to the top of the cross beam 51, the portions of these plates 52 forward of the cross beam 51 having rectangular downward extensions 53 capped by a top plate 54 and connected by a vertical front plate 55. These downward extensions 53 of the forwardly converging upright front plates 52 carry a horizontal rectangular cross bar 56 having downward extensions 58 at its ends which are carried by front sheering axles 59 for the harvester. The front steering wheels 60 are connected to the ends of each of these axles through a conventional king pin 61 and steering knuckle 62, the latter having steering arms connected together by a pair of steering rods 63 the opposing ends of which are connected together by a steering link 64. This last steering link can be moved to the right or left from the manual steering wheel 30 through any suitable steering linkage (not shown).

As best shown in FIGS. 2 and 6, the frame 46 also includes a front pair and a rear pair of spaced upstanding cross plates 65 connecting the main longitudinal side frame bars 45. The space between each pair of these cross plates is indicated at 66. As best shown in FIG. 6, the opposite ends of these cross plates are formed to provide extensions 68 which project upwardly and outwardly from the corresponding main longitudinal side frame beam 45 and each pair of which carries a pivot pin 69 spanning the space 66 for a purpose which will presently appear. Centrally between the main longitudinal side frame bars 45, each cross plate 65 is provided with an opening 70 to accommodate operating linkage as hereinafter described.

The harvester frame 46 is continued rearwardly from the axle housing 38 of the tractor in the form of parallel side plates 71 bolted, as at 72, to this axle housing and to each of which is bolted a plate 73 projecting downwardly therefrom. To the lower end of each plate 73 is secured one of a series of horizontal cantilever bars or ribs 74 which extend lengthwise of the line of travel of the harvester and support a rear platform 75 in the form of an inverted rectangular pan, as shown in FIG. 13, which extends the full width of the harvester, as shown in FIG. 4, and is adapted to support boxes 76 to be filled with the cucumbers as hereinafter described.

Figure 12:
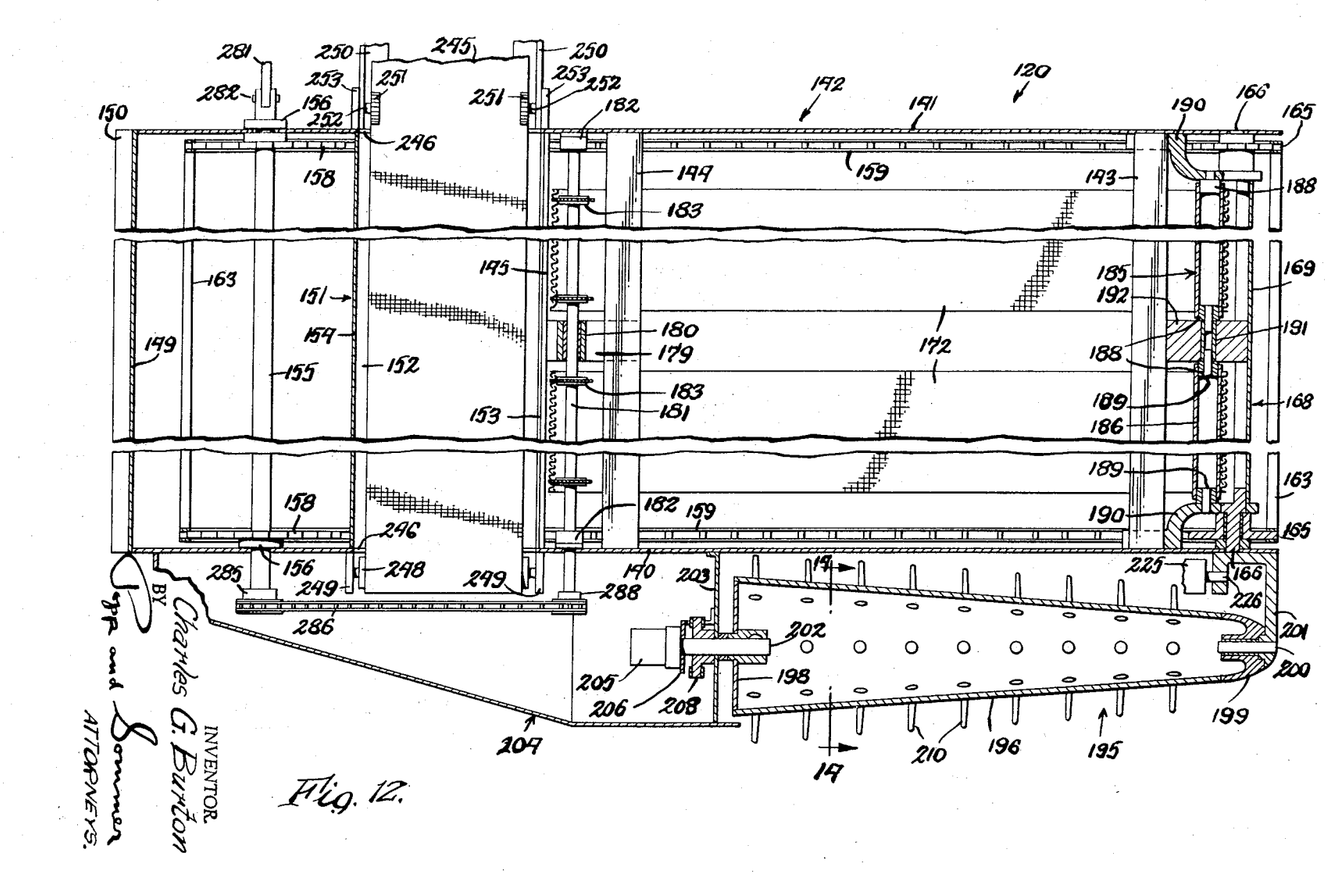
FIG. 12 is a section taken generally on line 12—12, FIG. 7.
Figure 13:
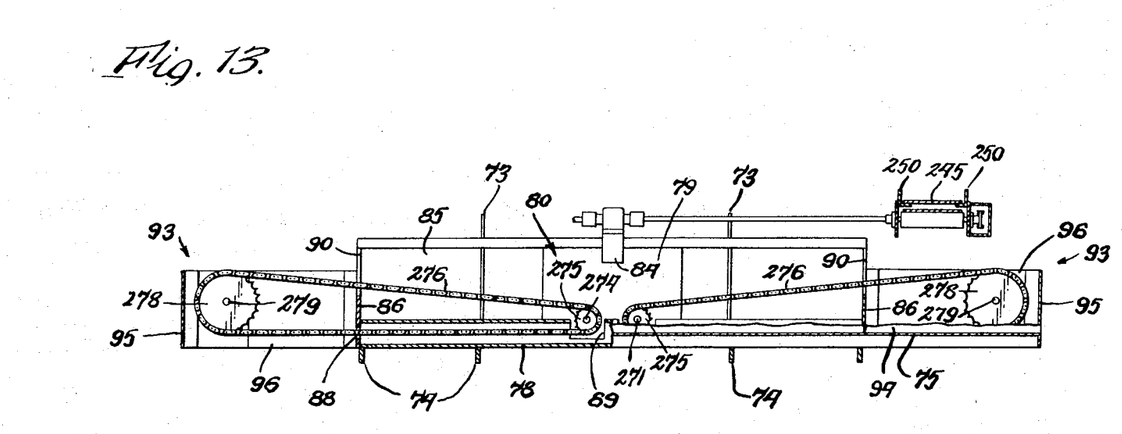
FIG. 13 is a fragmentary vertical transverse section taken generally on line 13—13, FIG. 1.

As best shown in FIGS. 4 and 13, a tubular cross beam 78 of rectangular form in cross section is secured to the cantilever platform bars or ribs 74 along the front of the rear platform 75 and an upright plate 79, arranged transversely of the harvester line of travel, is secured to the center of this tubular cross beam 78 to project upwardly therefrom, as best shown in FIGS. 4 and 13, and form the rear wall of a gear box 80 which in turn has forward extensions 81 and 82 secured by brackets 83 to the rear end of the rear gear box 32 of the tractor chassis 25. At its center, this gear box 80 supports a bearing stand 84 having depending legs embracing the front wall and rear walls 79 of the gear box 80, as best shown in FIGS. 4 and 12. The platform 75 has a front upright curb or plate 85 extending along the top of the tubular cross bear 78 from one end thereof to the other and terminating in upright plates 86 forming end heads for the tubular cross beam 78 and each having a chain hole 88 therein opening to the interior of the tubular cross beam 78 which also has a pair of spaced chain and sprocket holes 89 in its top at its center, as best shown in FIG. 13. Each end plate 86 projects upwardly from its end of the tubular cross beam 78 and is provided with a chain slot 90 extending downwardly from its upper edge.

The main frame 46 includes sprocket housings 93 at the opposite ends of the tubular cross beam 78 in front of the ends of the platform 75. Each of these sprocket housings includes a vertical rear panel 94 extending from the rear end of the corresponding vertical end plate 86 along the front edge of the platform 75 to the end thereof, an outer vertical end wall 95 extending forwardly from the outer end of the back wall 94, and a front vertical wall 96 extending between the front ends of the end walls 86 and 95.

CUTTER FOR EXCESS OF VINES

It is desirable to cut off the excessively long vine extremities both because they will not be productive during the cucumber growing season and also because such excessively long extremities interfere with the proper operation of the harvester, particularly by being trampled on by the wheels 26 and 60 and being held down under these wheels while the vine lifting and harvesting mechanism is lifting the bearing portion of such vine between its roots and such excessively long extremity so held down by the wheels.

To this end, as best shown in FIGS. 1 and 2, a circular rotary cutter blade 100 is mounted alongside each ground engaging front steering wheel 60 to rotate about an axis parallel with the steering wheel axis and preferably provided with indents 101 so that when contacted by vine ends or the ground it will rotate with its periphery traveling at ground speed. These cutter disks can be moved up and down from an inoperative raised position to a lowered operative position, by the operator seated on the seat 31 and to this end each vine cutter disk 100 is journalled at the outboard end of an arm 102 the inboard end of which is journalled on the end of the corresponding front steering axle 59. Each arm 102 and its vine cutting disk 100 is lifted by means of an upright cable 103 attached at its upper end to a horizontal arm 104 fast to the end of a cross shaft 105 which is common to the two arms 104. This cross shaft is journalled in bearings 106 carried by the horizontal rectangular cross bar 56 of the harvester frame and has fast thereto an upright arm 108 connected by a link 109 with an upright arm 110 fast to a cross shaft 111 journalled at 112 on the harvester frame 46. This cross shaft 111 has a pair of upright lever arms 113 fixed to its ends and each connected by a helical tension spring 114 with the tractor lever 36, which, as previously indicated, is moved back and forth to any set position by manipulation of the operator's hand lever 35.

VINE LIFTING AND CUCUMBER HARVESTING MECHANISM

Supporting arms

The vines from each root are simultaneously worked on by counterpart vine lifting and cucumber harvesting mechanisms 120 journalled on the harvester frame pivot pins 69 and each of which is preferably constructed as follows:

As best shown in FIGS. 1, 2 and 6, the numeral 121 represents a sheet metal arm of inverted U-shape in cross section journalled at its upper inner end on a corresponding frame pivot pin 69 with its side walls 122 in closely spaced relation to the opposing faces of the pair of frame cross beam extensions 68 supporting each of these pivot pins. Each of these sheet metal arms 121 has a top wall or web 123 connecting the upper edges of its side walls 122 and also has an upright rear wall 124 adapted to come into engagement with the outer side of the main longitudinal side frame bars 45 in the fully depressed positions of these arms 121, as best shown in FIG. 6.

A feature of the invention resides in each of these sheet metal arms having extension plates 125 adjustably secured to each pair of sidewalls 122 so as to be capable of being mounted at different elevations with reference to its arms 121. Each pair of these extension plates 125 can be cross connected by a vertical web 126 and is provided with an upper horizontally spaced pair of mounting holes 128 and a lower horizontally spaced pair of mounting holes 129, these holes being in vertical alinement with each other. Each side wall 122 of each sheet metal arm 121 is provided with a similar group of at least three of these holes, designated at 128' and 129'. It will be seen that with the holes 128, 129 in register with the holes 128' and 129' the pairs of extension plates 125 will be at the lower elevation, shown in FIG. 6, with reference to their sheet metal supporting arms 121. With the holes 129 in register with the holes 128', the pairs of extension plates will be at a high elevation. Each position can be maintained by a bolt 130 passing through the outboard pair of registering holes and by a pivot pin 131 passing through an inboard pair of these registering holes, the latter supporting a connecting rod or link 132 which extends downwardly and outwardly therefrom. The outboard end of each arm extension plate 125 is provided with upper and lower holes 133, 134 in vertical alinement with each other. A pivot pin 135 is adapted to be inserted through either the upper or lower pair of these holes of each pair of plate extensions 125 and this pivot pin carries the upper end of a downwardly and outwardly inclining connecting rod or link 136.

Frame for each vine lifting and cucumber harvesting mechanism

Figure 3:
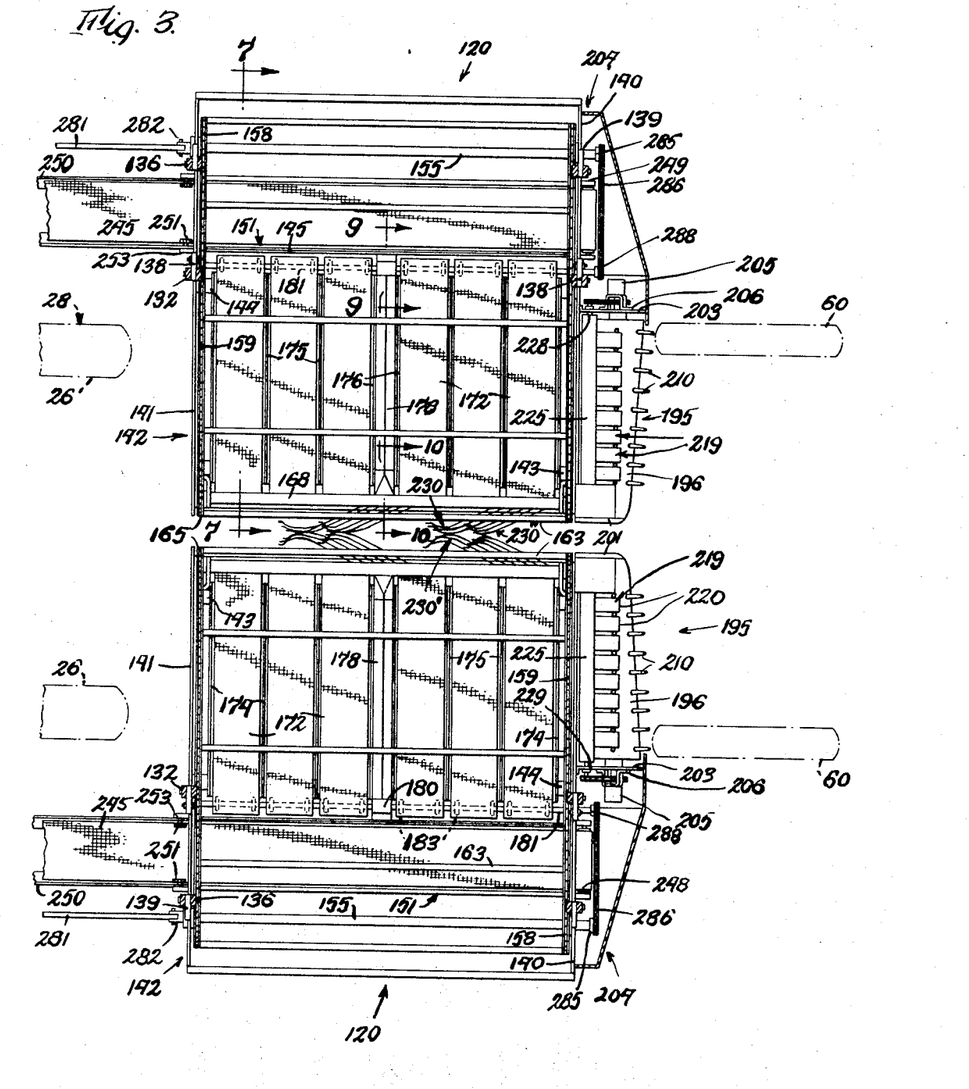
FIG. 3 is an enlarged horizontal sectional view taken generally on line 3—3 of FIG. 1 and showing the vine lifting and cucumber harvesting mechanisms in plan.
Figures 7, 8, 9, 10, 11:
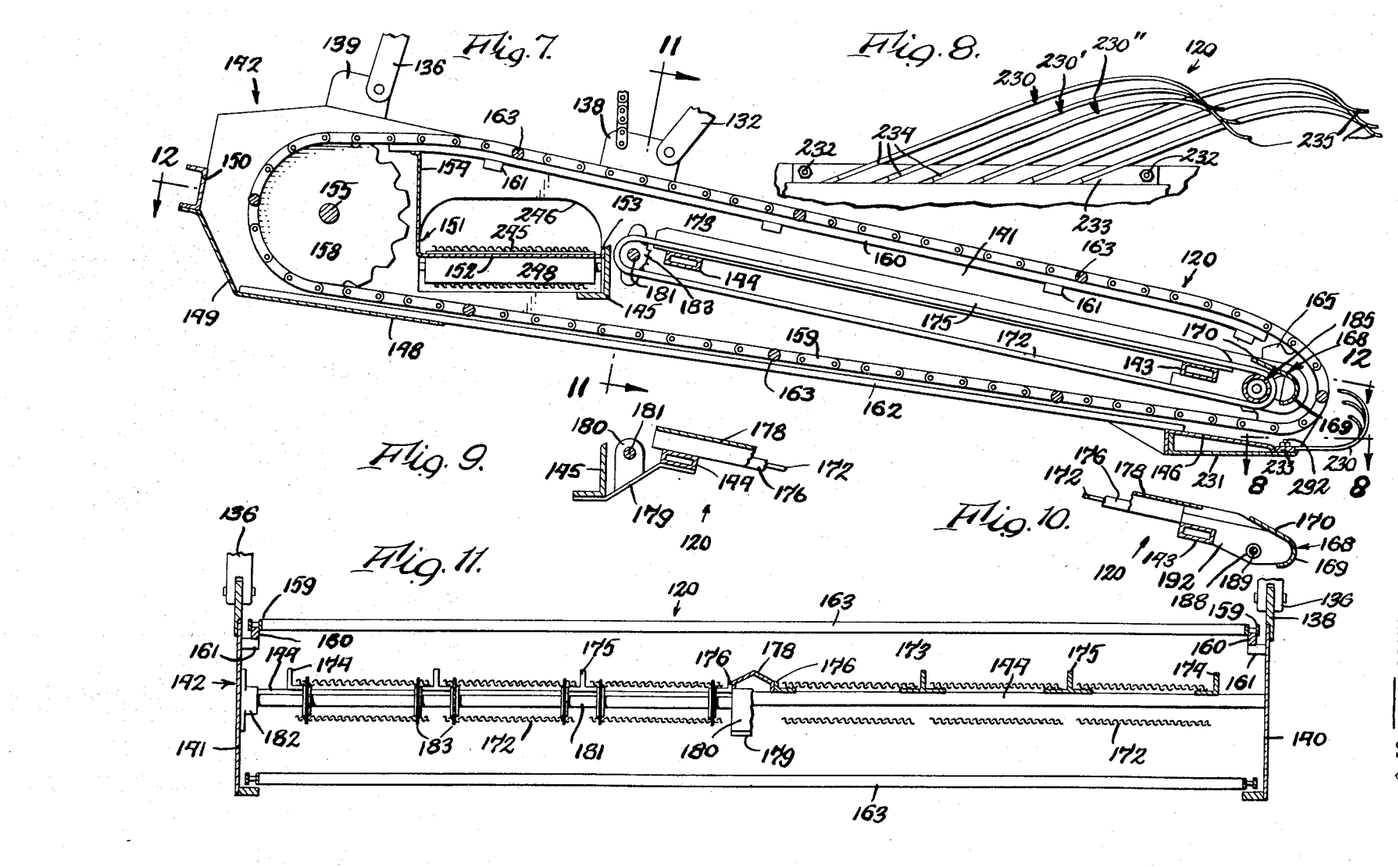
FIG. 7 is an enlarged transverse sectional view taken generally on line 7—7, FIG. 3 and illustrating one of the cucumber harvesting mechanisms in greater detail.
FIG. 8 is an enlarged fragmentary top plan view taken generally along line 8—8, FIG. 7.
FIGS. 9 and 10 are enlarged fragmentary vertical sections taken generally on the correspondingly numbered lines of FIG. 3.
FIG. 11 is a fragmentary vertical section through one of the cucumber harvesting mechanisms, this section being taken generally on line 11—11, FIG. 7.

As shown in FIGS. 1–3, 6 and 7–12, these connecting rods or links 132, 136, through upstanding ears 138, 139, support the front and rear upright walls 140, 141 of the supporting frame 142 for the vine lifting and cucumber harvesting mechanism 120 at each side of the harvester. As best shown in FIGS. 3, 7 and 12, each pair of these frame front and rear walls 140, 141 are connected by hollow spaced bars 143, 144 extending lengthwise of the line of travel of the harvester; by a metal angle iron 145 spaced outwardly from and parallel with the cross bar 144; by an inner bottom wall 146 at the center of the harvester; by an outer bottom wall 148 which, as best shown in FIG. 7, is continued to provide a side wall 149 terminating in a metal channel bar 150 connecting these front and rear walls 140, 141; and by a sheet metal pan 151 for the upper stretch of a conveyor, as hereinafter described, having a bottom wall 152, a low side wall 153 toward the center of the harvester, and a high wall 154 along its opposite edge.

Chain and picking bar mechanisms

As best shown at the left of FIG. 12, each of the counterpart vine linfting and cucumber harvesting mechanisms 120 includes an outer drive shaft 155 parallel with the line of travel of the harvester and journalled at its ends in bearings 156 mounted on the front and rear walls 140, 141 of the frame 142, this drive shaft extending through these front and rear walls. Adjacent the opposing faces of the front and rear walls 140, 141, each drive shaft 155 has fixed thereto drive sprockets 158 carrying endless roller chains 159 on the upper and lower stretches of which travel along the the faces of the front and rear walls 140, 141, the upper stretches being supported on rails 160 mounted on brackets 161 carried by these front and rear walls and the lower stretch being supported on rails 162 also carried by these front and rear walls, as best shown in FIGS. 7 and 11. An important feature of the harvester is in the provision of cylindrical cucumber picking bars 163 cross connecting the front and rear chains 159, at suitably spaced intervals, of each of the counterpart vine lifting and cucumber harvesting mechanisms 120. These picking bars serve to knock or comb the cucumbers off of the lifted vines as hereinafter described. It is also critical that the upper stretch of these picking bars 163 travel upwardly and outwardly at an angle of about 12° to the horizontal.

The turn of each endless chain 159 which is adjacent the center of the harvester travels around an idler sprocket 165 journalled on pins 166 welded to the front and rear walls 140, 141 of the frame 142, as best shown at the right of FIG. 12. The opposing ends of each pair of these stationary pins 166 are cross connected by a C-shaped sheet metal bar 168 having a rounding semicylindrical nose 169 terminating in an upper shelf portion 170 which extends over the lower return bends of cucumber gathering chain belts to prevent vines from getting wound up therein as hereinafter described.

Cucumber gathering chain belts

These cucumber gathering chain belts 172 for each of the counterpart vine lifting and cucumber harvesting mechanisms 120 are arranged in spaced relation to one another within the space 173 defined by the round cross bars 163 fast to the front and rear chains 159 and with the upper and lower stretches of these belts 172 being generally parallel to the upper and lower stretches of these chains 159. As best shown in FIGS. 7 and 11, the outside edges of the upper stretches of the front and rear chain cucumber gathering belts 172 are supported on the flanges of angle irons 174 bridging the space between and supported by the cross frame bars 143, 144, while, except at the center, the remaining edges of all of these cucumber gathering chain belts are similarly supported on the flanges of T-irons 175 which are similarly supported on the frame bars 143, 144. At the center of each counterpart vine lifting and cucumber harvesting mechanism 120, the opposing edges of the upper stretches of the center cucumber gathering chain belts are supported by the flanges of angle irons 176 similarly carried by frame bars 143 and 144. The space between these angle irons 176 is bridged by an inverted V-shaped sheet metal ridge piece 178 which is also supported on the frame bars 143, 144. These angle and T-bars 174, 175 and ridge piece 178 rise above the narrow cucumber gathering belts to form stationary rails which tend to move the cucumbers moving up these belts into parallel relation with one another.

As best shown in FIGS. 9, 11 and 12, from under the upper end of this ridge piece 178 a strap 179 connects the frame bar 144 with the center of the adjacent angle bar 145 and supports a center bearing 180 for the drive shaft 181 of the cucumber gathering chain belts 172, the opposite ends of this drive shaft being journalled in bearings 182 on the front and rear plates 140 and 141 of the frame 142 and projecting through the front frame plate 140, as best shown in FIG. 11. The drive shaft 181 carries a pair of drive sprockets 183 the teeth of which enter the mesh of each chain conveyer belt 172. The opposite end of each chain conveyer belt 172 passes around a roller 185 each in the form of a tubular cylinder 186 containing a bearing bushing 188 at each end journalled on a pin 189. As best shown in FIG. 12, the outer pins 189 of the endmost rollers are fixed to brackets 190 secured to the inside faces of the front and rear frame walls 140, 141. The other bearing pins 189 of these rollers 186 are fixed in sleeves 191 contained in a block 192 which has a rounded end fitted and secured in the rounded nose portion 169 of the C-shaped cross bar 168 and its opposite end fixed to the frame bar 143, as best shown in FIGS. 10 and 12.

Rotors lifting vines from the ground

An important feature of the invention resides in the use of a conical, rubber fingered rotor 195 as a part of each vine lifting and cucumber harvesting mechanism 120, to elevate the vines from the ground, a short distance at their root ends, to progressively greater heights at their outer ends, and thereafter deposit the vines with their cucumbers on the chain borne picker bars 163 which knock or comb the cucumbers from the vines and redeposit the picked vines on the ground. As best shown in FIGS. 3, 6, 12 and 14 each of these rotors 195 comprises a conical sheet metal body 196 having a sheet metal disk 198 enclosing its large end and a rounding nose 199 enclosing its small end, as best shown in FIG. 12. Each nose 199 is journalled on a coaxial bearing pin 200 fixed to a bracket 201 in turn secured to the external face of the corresponding front wall 140 of the frame 142 in line with the pivot pin 166 for the sprocket 165. Each end disk 198 has a drive shaft 202 fixed axially thereto and projecting through the wall 203 of a chain gear housing 204 fixed to the outer face of the front wall 140 of the frame 142 in position to enclose drive gearing for the vine lifting and cucumber harvesting mechanism 120 as hereinafter described. Within this housing each drive shaft 202 is connected to a hydraulic motor 205 carried from the wall 203 by a U-shaped bracket 206 which accommodates a pinion 208 fast to the drive shaft 202, as best shown in FIGS. 6 and 12, for a purpose which will presently appear.

The axis of each conical rotor 195 is generally in line with the plane of the frame 142 of its vine lifting and cucumber picking mechanism, which plane is adjustable, as hereinafter described, and each rotor 195 has a plurality of rubber fingers 210 projecting radially outwardly in spaced annular rows from substantially its entire conical body part 196.

Transfer mechanism

Figure 14:
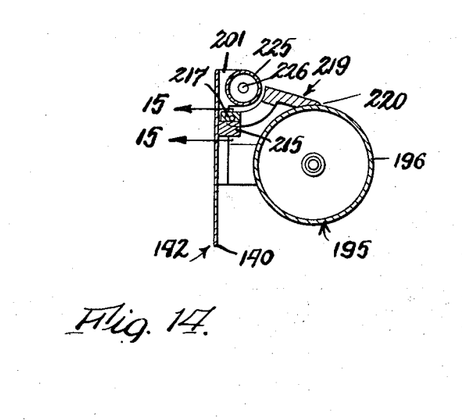
FIG. 14 is a fragmentary vertical longitudinal section taken generally on line 14—14, FIG. 12.
Figures 15, 16:
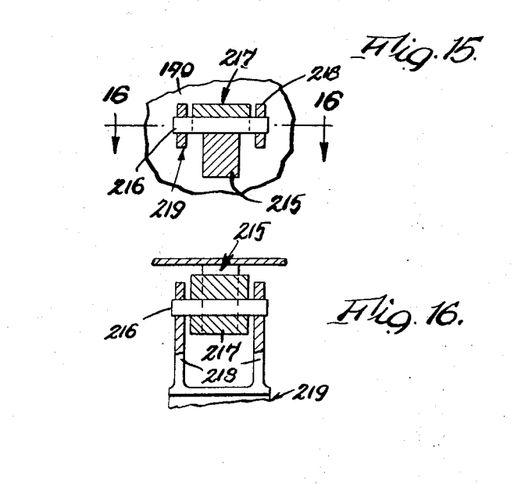
FIG. 15 is a fragmentary vertical section taken generally on line 15—15, FIG. 14.
FIG. 16 is a fragmentary horizontal section taken generally on line 16—16, FIG. 15.

To provide smooth transfer of the vines, without loss of cucumbers therefrom, from the rotors 195 to the picking bars 163 connecting the chains 159, a plurality of spaced brackets 215, best shown in FIGS. 14–16, project forwardly from each front wall 140 of the frame 142 in line with the spaces between the annular rows of rubber fingers 210 of the conical rotors 195. A bearing pin 216 is secured to each of these brackets 215 by a cap 217, these bearing pins being in line and generally parallel with the top surface of the adjacent conical rotor 195. On each of these pins is journalled the arms 218 of a scraper 219, each scraper resting on the crest of the conical body 196 of the adjacent rotor 195 and having a relatively sharp edge 220 opposing the movement of the periphery of the conical body, as best shown in FIG. 14, so that laden vines picked from the ground by the rubber fingers 210 of the rotors 195 are scraped off the crests of these rotors and caused to travel over the tops of the scrapers 219 onto a transfer roll 225 associated with each conical rotor 195.

Each transfer roll is above and parallel with the pivot pins 216 of the companion row of scrapers 219. As best shown in FIG. 12, a pivot pin 226 at one end of each transfer roll 225 is journalled in the bracket 201 which also journals the nose end 199 of the corresponding conical rotor 195. As best shown in FIGS. 3 and 6, a drive shaft 228 at the opposite end of each transfer roll 225 is journalled in a bearing 229 in the inner end wall 203 of the corresponding gear housing 204.

Crown and loose cucumber recovery

To recover loose cucumbers along the center of each row, as well as to pick the crown cucumber or cucumbers which develop on one of the vines immediately above the roots of the plant, a plurality of spring fingers 230, 230', 230" of special form are mounted on each frame 142 to project to the centerline of the row of cucumber plants and hence into contact with one another from opposite sides of the harvester. To this end a plate 231, FIG. 7, is secured to the bottom plate 146 of the frame 142 of each counterpart vine lifting and cucumber harvesting mechanism 120 and one edge of this plate projects under the rising parts of the chains 159 and cross picking rods 163 carried by these chains. On this projecting edge, as best shown in FIGS. 7 and 8, is mounted, as by bolts 232, a bar 233 to which the bases 234 of the spring fingers 230, 230' and 230" are welded or otherwise secured. These spring fingers are in groups of three, all being generally of the same shape with their body portions 234 welded to project horizontally at the same included angle (of about 20°) from the bar 233, but curving upwardly and toward the center of the harvester to different heights, the lead spring fingers 230 of each group rising to the least height and the trailing spring fingers 230" of each group rising to maximum height. The upper ends of these body portions are also curved to extend upwardly and away from the center of the harvester, these curved upper ends of the lead spring fingers 230 at opposite sides of the center of the harvester preferably contacting one another. Each spring finger terminates in a tail portion 235.

Elevating mechanism

Both of the counterpart vine lifting and cucumber harvesting mechanisms 120 are spring mounted to float and can be simultaneously raised or lowered to adjust their elevation from the ground and their spacing from each other to suit the degree of growth of the cucumber vines and the soil conditions.

As best shown in FIGS. 1 and 2, fixed to the control shaft 111 are three segments 236 which are arranged side by side. To the lead end of the rim of the center segment 236 is attached a chain 237, and to the lead end of the rim of each of the side segments is attached a chain 238, these chains being drawn forwardly of the harvester in response to corresponding movement of the control shaft 111 and these chain segments 236. Each chain 238 travels around a sprocket 239 in an opening 70 at the center of the forward cross beam 46, as best shown in FIGS. 2 and 6, and thence along through this cross beam and its extension 121 to a second sprocket 240 from which it drops down and is attached to the corresponding ear 138. The chain 237 attaches to a similar pair of chains 238 traveling around similar sprockets 239 in openings 70 at the center of the rear cross beam 46, and thence along through this rear cross beam and its extension 121 to a second sprocket 240 from which it drops down and is attached to the corresponding ear 138.

It will be seen that adjusting the shaft 11 to swing the chain segments 236 forwardly pulls on all of the chains 238 to lift their ends attached to the ears 138 and hence swing both of the vine lifting and cucumber harvesting mechanisms 120 about the links or connecting rods 132, 136, FIG. 6. The length of these links is proportioned so that this adjusts the two counterpart vine lifting and cucumber harvesting mechanisms 120 upwardly and away from each other, there being little change in their angularity with reference to the horizontal. This adjustment of this shaft 111 is through the tension spring 114 (FIG. 1) which therefore yieldingly supports both of the counterpart vine lifting and cucumber harvesting mechanisms 120 so as to provide a floating mounting therefor.

CONVEYER FROM VINE LIFTING AND CUCUMBER HARVESTING MECHANISMS

Each inclined chain belt 172 discharges cucumbers onto the upper stretch of an endless chain conveyor belt 245 which travels lengthwise of the line of travel of the harvester. This upper stretch is supported by and travels along the corresponding pan 152 forming part of the frame 142 of each counterpart vine lifting and cucumber harvesting mechanism 120 and passes through openings 246 in the front and rear walls 140, 141 of this frame, as best shown in FIGS. 7 and 12. At the front of the harvester each endless belt 245 passes around an idler roller 248 journalled in brackets 249 projecting forwardly from the front face of the front frame wall 140 on opposite sides of its opening 246. From the opening 246 in the rear frame wall 141, the upper stretch of each conveyor belt 245 is held down upon inclined side rails 250 by rollers or wheels 251, these rollers or wheels 251 being journalled on pins 252 which can also serve to pivotally connect the lower end of each rail 250 with a bracket 253 protruding rearwardly from the rear face of the rear frame wall 141, as best shown in FIG. 12.

Each pair of rails 250 rises from their connections with the rear wall 141 of their frame 142 to a discharge housing 255 which can be mounted on the harvester main frame 46 in any suitable manner as by being mounted on a frame cross bar 256 carried by the frame plates 86. Each discharge housing 255 is shown as including side plates 257 in which horizontal shafts 258 and 259 are journalled in suitable bearings, as best shown in FIG. 5, to bridge the space between these plates. Each shaft 258 carries fixed drive sprockets 260 which mesh with and drive its chain conveyor belt 245. Each shaft 259 is shown as carrying a loose roller 261 for supporting the lower stretch of the corresponding conveyor chain belt 245. The outer plate 257 is also shown as carrying a chain gear housing 262. The cucumbers discharged from the end of the chain conveyer belt 245 passing over the drive sprockets 260 can fall into boxes 76 on the platform 46.

POWER FLOW

As previously indicated, one of the sources of movement is the hydraulic motor 205, FIGS. 3, 6 and 12, having drive shafts 202 supporting and rotating the rubber fingered conical rotor 195 of each counterpart vine lifting and harvesting mechanism 120. These rotors 195 rotate in the direction that their rubber fingers 210 pass under the approached vines on the ground and lift them up. The drive sprockets 208 on these drive shafts 202 through drive chains 265, drive sprockets 266 on the shafts 228 for the transfer rolls 225 to rotate these rolls in the direction to have their top surfaces move in the direction to urge vines and their cucumbers from the rubber fingered rotors 195 and their scrapers 219 into the zone of action of the picking bars 163 on the chains 158.

The tractor power take-off shaft 34 (FIG. 4) through a sprocket and chain drive 270, drives a shaft 271 journalled in the gear box 80 which, through gears 272, 273, drive a second shaft 274 journalled in this gear box in the same horizontal plane, these shafts extending lengthwise of the harvester travel. A sprocket 275 on each of these shafts 271, 274, through a chain 276 and sprocket 278, drives a horizontal shaft 279 journalled in each gear chain housing 93 parallel with the shafts 271, 274. Through a universal joint 280, each of these shafts 279 drives an inclined shaft 281, connected at its forward end (FIG. 1) through a universal joint 282 with the end of the shaft 155 (FIG. 11) of the corresponding counterpart vine lifting and cucumber harvesting mechanism 120 and which shaft carries the corresponding pair of sprockets 158 for the pair of chains 159 carrying between them the cucumber picking bars 163, the opposite turns of these chains being carried by the sprockets 165. These chains 159 are driven to move the picking bars 163 on their upper stretches upwardly from the center of the harvester to the outboard side of each vine lifting and cucumber harvesting mechanism 120, these picking bars returning on the bottom stretches of these chains.

The rotation of each shaft 155 (FIG. 12) also rotates a sprocket 285 also fixed thereto in the corresponding gearing housing 204, and through a chain 286 and sprocket 288, this drives the corresponding shaft 181 of the cucumber gathering chain belts 172, the opposite turns of these cucumber gathering chain belts being carried by the loosely journalled rolls 186. These cucumber gathering chain belts 172 are driven to move their upper operative stretches upwardly from the center of the harvester to gather and elevate the cucumbers knocked off the vines by the cucumber picking bars 163.

The tractor power take-off shaft 34 (FIG. 5) through a belt drive 290 also drives the drive shaft 291 of a gear box 292 which is mounted on the gear box 80 (FIG. 4) in any suitable manner. Universal joints 293 are connected to the coaxial opposite horizontal output shafts of this gear box and each turns a shaft 294 connected at its opposite end to the shaft 259 in the corresponding chain gear box 262. Through the pinion and chain drive 295 in each chain gear box 262, this drives the corresponding shaft 258 and sprockets 260 meshing with and supporting the upper end of the corresponding conveyer chain belt 245. The opposite turn of each of these conveyer chain belts 245 are carried by the roller 248 (FIG. 12) at the forward end of the frame 142 for the corresponding vine lifting and cucumber gathering mechanism 120, the upper stretch of the chain conveyer belt 245 passing through its frame 142 being positioned, as shown in FIG. 7, to receive cucumbers gathered and elevated by the cucumber gathering chain belts 172.

The power take-off shaft 33 (FIGS. 4 and 5) can be used to drive blowers for cleaning leaves and vine ends from the harvested cucumbers, such blowers forming no part of the present invention and hence not being shown.

OPERATION

The cucumber plants are cultivated at spaced intervals in rows set far enough apart to accommodate the present harvester. Their vines are encouraged to grow laterally of the row, preferably in herringbone fashion. The harvester of the present invention is driven in centered relation down each row, the tractor 28 straddling the row and being driven in centered relation down the row, being propelled by its large rear drive wheels 26. For clarity, the chassis 25 and these rear drive wheels 26 of the conventional farm tractor employed are shown in broken lines.

It will be assumed that the power flow just described is operative and that the operator, through the hand lever 35, FIG. 1, has adjusted the lever 36 forwardly and hence, through the linkage 114, 113, 109, 108, 104, 103 and 102, to have lowered the two indented cutting disks 100 arranged along the inside of each front steering wheel 60. Accordingly the ends of the vines growing herringbone fashion from the row of plants being harvested have their end extremities cut off by these cutting disks so that the mat or swath of vines to be harvested are less than the spread of the front rear wheels 60 and 26 of the harvester. Not only does this get rid of the extremities of the vines, but it prevents the vines being harvested from being trampled on and caught under the wheels 60, 26 of the harvester. Since the harvester operates to lift these vines and knock or comb the cucumbers therefrom and then redeposit the vines on the ground for further cucumber growing, it will be seen that without the cutting disks 100, excessively long vine ends could easily be caught under the wheels 60 or 26 while the inner ends were being lifted with the result that the plant would be uprooted, or productive vines torn from the roots. Also the harvester will not handle vines above a predetermined length.

The above assumed forward adjustment of the lever 36 (FIG. 1, by the hand lever 35) has adjusted the linkage 114, 113, 111, 235 and chains (FIG. 2) 237 and 238 (FIG. 6) to have lowered the frames 142 of the counterpart vine lifting and cucumber harvesting mechanisms 120 to their lowered operative position shown in FIG. 6, this lowering being permitted by the pairs of swinging links or connecting rods 132, 136 which suspend these frames from opposite sides of the harvester frame 46.

In this lowered operative position of the counterpart vine lifting and cucumber harvesting mechanisms 120, the noses 199 (FIG. 6) of the rubber fingered conical rotors 195 are on opposite sides of the row of plants and their bottom fingers 210 sweep close to the ground to engage and lift the cucumber bearing vines from the ground. These vines are lifted by these rubber fingers 210 and carried over the tops of the rotors 195, the outer ends of the vines being lifted to a higher elevation than the rooted ends thereof by virtue of the conical shape of the rubber fingered rotors 195.

At the crest of these rotors 195, the rubber fingers 210 carry the vines bearing cucumbers onto and over the scrapers 219 (FIG. 13) and onto the crest of the transfer roll 225. This transfer roll is power rotated to urge the cucumber bearing vines onto the ends of the cucumber picking bars 163 (FIG. 3).

These picking bars are traveling outwardly and upwardly at opposite sides and from the center of the harvester and the cucumbers on the vines supported by these moving picking bars 163 drop by gravity into the space 173 (FIG. 7) below the operative picking bars. As the picking bars come into contact with the stem end of such pendant cucumbers they tend to knock or comb the cucumbers from the vines, the cucumbers falling onto the upwardly moving upper stretches of the cucumber gathering chain belts 172.

The cucumbers so gathered and elevated engage the upstanding rails 174, 175 and ridge piece 178 which tend to draw them into parallel relation with one another and in such relation the cucumbers topple over the upper ends of these cucumber gathering chain belts 172 onto the upper stretch (FIGS. 7 and 12) of the chain conveyer belts 245 at opposite sides of the harvester. These convey the cucumbers rearwardly from the counterpart vine lifting and cucumber harvesting mechanisms 120 through the openings 246 in the rear walls 141 of the frames 142 thereof and up to the housings 255 (FIG. 1) above the platform 75 at the rear of the harvester frame 46. In these product discharge housings 255 the cucumbers topple from the upper return bends of the chain conveyer belts into boxes 76 on the platform 75 and which boxes are removed and replaced when filled.

As previously indicated, it is also important to remove the crown or first formed cucumber or cucumbers which develop close to the root of each vine, as well as any loose cucumbers which may have been knocked off the vines and which tend to collect in line with the row of plants. Such removal is effected by the successive groups of spring fingers 230, 230', 230'' which yieldingly finger or successively bear against the undersides of the root end extremities of the elevated vines and cause the crown cucumber to be raised and fall over to break its stem connection with its vine. These spring fingers are shaped, as best shown in FIGS. 3, 6, 7 and 8, so that the falling crown cucumber falls to the base ends of the fingers which are in the zone of action of the rising picking bars 163 at opposite sides of and close to the roots of the row of vines. These rising picking bars lift the crown cucumber and carry it over to drop onto the cucumber gathering chain belts 172 to join the other harvested cucumbers falling on these belts.

For travel on the highways, the harvester can be reduced to legal width by removing the outrigger sprocket housings 93 (FIGS. 1, 4 and 12), as well as the rear platform 75 (FIG. 4) which can be stowed on top of the harvester while traveling the highways. Also, for such highway travel, the arms 121 (FIG. 6) can be swung about the pins 69 to a vertical upright position, and lashed, thereby supporting the frames 142 for the counterpart vine lifting and cucumber picking mechanisms in a vertical position instead of from about 10° to about 12° to the horizontal as shown in FIG. 6.

From the foregoing, it will be seen that the present harvester accomplishes the objects set forth, namely, (1)

maximum harvest with minimum injury to the vines by arranging the upper stretches of the picking bars 163 to travel upwardly and outwardly from the root end of the row of vines being harvested at an angle of from about 10° to about 12° to the horizontal, (2) the frames 142 for the vine lifting and picking mechanisms 120 being vertically adjustable without disturbing this critical angle, (3) gentle lifting of the laden vines being accomplished by the rubber fingered rotors 195, scrapers 219 and power transfer rolls 225, (4) the excess length of vines being cut off by the cutter disks 100 to prevent them from possibly causing uprooting of the plants, (5) facilitating the picking of crown cucumbers (the first to form at the root ends of the vines) by causing them to be struck from the bottom by rising picking bars 163 traversing the rising sides of the sprockets 165 (right of FIG. 7) and elevating these cucumbers by the spring fingers 230, 230' and 230" so that these rising picking bars have a solid unimpeded flow, (6) provide a full floating mounting for both counterpart vine lifting and cucumber harvesting mechanisms 120 by supporting both, through the chains 238 from the adjustable tension spring 114, (7) providing for straightening the harvested cucumbers by the provision of narrow gathering chain belts 172 supported at their edge by the stationary rails 174, 175 and 178 which rise therefrom, and (8) providing a convenient way, as by the use of different holes in the arms 121 and their extensions 125, for setting the vine lifting and cucumber harvesting mechanisms 120 at selected elevations.

What is claimed is:

1. A machine for harvesting cucumbers from a row of vines, comprising a first frame supported on the ground for travel along said row of vines, and a vine elevating and cucumber picking mechanism including a second frame, means connecting one side of said second frame to said first frame to position the opposite side of said second frame to travel along the root ends of said row of vines, a plurality of transversely spaced generally horizontal picking bars across said second frame arranged generally parallel with the line of harvester travel, means supporting said picking bars to travel sideways in a first turn about an axis along said opposite side of said second frame, thence along an upper stretch extending upwardly and outwardly toward said one side of said second frame at an angle of from about 10° to about 12° to the horizontal, thence in a second turn about an axis along said one side of said second frame and thence along a bottom stretch spaced downwardly from said upper stretch to said first turn, means lifting the vines onto said upper stretch of said picking bars, means moving said picking bars at sufficient speed to break the stems of cucumbers on said lifted vines which cucumbers fall by gravity to a pendant position into the space between the upper and bottom stretches thereof, cucumber gathering belt means across the space, lengthwise of said picking bars, between the upper and lower stretches thereof and having an upwardly moving upper stretch generally parallel with the upper stretch of said picking bars, and conveyer belt means receiving the cucumbers from said cucumber gathering belt means and conveying them from said second frame, said means connecting one side of said second frame to said first frame including two pairs of links arranged at different distances from said opposite side of said second frame and pivotally connected to said first and second frames about common axes extending lengthwise to the harvester travel, one pair of said links being longer than the other to so maintain said from about 10° to about 12° angle substantially constant in all operative positions of vertical adjustment of said second frame.

2. A machine for harvesting cucumbers from a row of vines, comprising a first frame supported on the ground for travel along said row of vines, and a vine elevating and cucumber picking mechanism including a second frame, means connecting one side of said second frame to said first frame to position the opposite side of said second frame to travel along the root ends of said row of vines, a plurality of transversely spaced generally horizontal picking bars across said second frame arranged generally parallel with the line of harvester travel, means supporting said picking bars to travel sideways in a first turn about an axis along said opposite side of said second frame, thence along an upper stretch extending upwardly and outwardly toward said one side of said second frame at an angle of from about 10° to about 12° to the horizontal, thence in a second turn about an axis along said one side of said second frame and thence along a bottom stretch spaced downwardly from said upper stretch to said first turn, means lifting the vines onto said upper stretch of said picking bars, means moving said picking bars at sufficient speed to break the stems of cucumbers on said lifted vines which cucumbers fall by gravity to a pendant position into the space between the upper and bottom stretches thereof, cucumber gathering belt means across the space, lengthwise of said picking bars, between the upper and lower stretches thereof and having an upwardly moving upper stretch generally parallel with the upper stretch of said picking bars, and conveyor belt means receiving the cucumbers from said cucumber gathering belt means and conveying them from said second frame, said cucumber gathering belt means comprising a plurality of chain belts arranged in succession edge to edge, and said second frame including angle bars supporting the edges of the upwardly moving upper stretches of said chain belts.

3. A harvesting machine as set forth in claim 2 wherein said angle bars project above the belts to provide tracks which tend to bring the cucumbers into parallel arrangement while being propelled on said belts.

4. In a machine for harvesting cucumbers from a row of vines and having a first frame supported on the ground for travel along said row of vines and a cucumber picking mechanism including a second frame, means connecting one side of said second frame to said first frame to position the opposite side of said second frame to travel along the root ends of said row of vines, a plurality of transversely spaced, generally horizontal picking bars across said second frame arranged generally parallel with the line of harvester travel, and means supporting said picking bars to travel sideways in a first turn about an axis along said opposite side of said second frame, thence along an upper stretch extending outwardly toward said one side of said second frame, thence in a second turn about an axis along said one side of said second frame and thence along a bottom stretch spaced downwardly from said upper stretch to said first stretch; the combination therewith of means lifting the vines onto said upper stretch of said picking bars, comprising a conical rotor journalled on said second frame to rotate about an axis extending transversely of the line of movement of the harvester and with its crest generally in line with and in advance of said upper stretch of said picking bars, the small end of said conical rotor being positioned to be adjacent the root ends of said vines, flexible fingers projecting radially from the periphery of said conical rotor and having a constant length exteriorly of said periphery in all angular positions of said rotor, and means rotating said conical rotor in the direction to pick vines from the ground and elevate them to the crest of the conical rotor for transfer to said upper stretch of said picking bars.

5. The combination set forth in claim 4 wherein said flexible fingers are in annular axially spaced rows around the periphery of said conical rotor and additionally including scrapers movably mounted on said second frame and each engaging the crest of the periphery of said rotor between a corresponding row of fingers to guide vines onto said upper stretch of said picking bars.

6. The combination set forth in claim 5 additionally including a transfer roller arranged generally parallel with the crest of said conical rotor and interposed between said scrapers and upper stretch of said picking bars and means rotating said transfer roller in the direction to transfer vines from said scrapers onto said upper stretch of said picking bars.

7. A machine for harvesting cucumbers from a row of vines, comprising a first frame supported on the ground for travel along said row of vines, a second frame having front and rear frame members forming the front and rear ends of the frame, means connecting the outboard end of said second frame to said first frame to position the inboard ends of said frame members at a lower elevation than the outboard ends thereof and to travel close to the ground along the root ends of said row of vines, first sprockets severally journalled on the inboard ends of said frame members to rotate about a horizontal axis extending lengthwise of the harvester travel, said sprockets being positioned to travel underneath the root ends of said vines, second sprockets severally journalled on the outboard ends of said frame members in the vertical planes of said first sprockets, an endless chain connecting the sprockets on each frame member, laterally spaced picking bars secured at their opposite ends to the two chains, and means moving said chains to effect upward movement of the bars traversing the sides of the first sprockets remote from the second sprockets, thereby to effect an upward blow by the picking bars against the cucumbers at the root ends of the vines to facilitate their separation from the vines, said second frame including a cross frame member arranged below said first sprockets, and a row of spring fingers secured at one end to said cross frame member and extending outwardly therefrom beyond such upwardly moving picking bars and thence upwardly and thence rearwardly with reference to the harvester travel, whereby said spring fingers serve to yieldingly elevate the root ends of the vines to facilitate such upwardly moving picking bars striking a cucumber growing therefrom.

8. A machine for harvesting cucumbers from a row of vines, comprising a first frame supported on the ground for travel along said row of vines, a pair of counterpart vine elevating and cucumber picking mechanisms each including a second frame arranged to pass on opposite sides of the row being harvested, and means carried by each second frame for gently lifting the vines of plants between them, harvesting the cucumbers therefrom and redepositing the vines on the ground, means pivotally connecting each of said second frames to said first frame for vertical movement relative thereto, and yielding means for simultaneously adjusting the vertical position of said second frames relative to said first frame, comprising a supporting chain connected to each of said second frames, means on said first frame guiding all said chains to a common adjusting member on said first frame which is movable to simultaneously adjust their effective lengths, and a helical tension spring actuating said common adjusting member and supporting all of said chains and said second frames.

9. A harvesting machine as set forth in claim 8 wherein said common adjusting member is a shaft having a plurality of arcuate segments attached thereto, said chains being operatively connected to corresponding ends of said segments to be wound up thereon.

10. A machine for harvesting cucumbers from a row of vines, comprising a first frame supported on the ground for travel along the row of vines and having a plurality of brackets projecting transversely outwardly therefrom relative to the line of harvester movement and arranged in pairs lengthwise of the line of harvester movement, an arm pivoted to each pair of said brackets to project transversely outwardly relative to the line of harvester movement, a horizontal outward projection secured to each of said arms, a pair of counterpart vine elevating and cucumber picking mechanisms each including a second frame arranged under said arms and projections at a corresponding side of said first frame, and means carried by each second frame for gently lifting the vines, harvesting the cucumbers therefrom and redepositing the vines on the ground, a first depending link pivotally connecting a pivot pin on each of said arms to the corresponding one of said second frames, a second depending link connecting a pivot pin on each of said projections to the corresponding one of said second frames and means for raising and lowering the position of said pivot pins with reference to said arms and projections to permit of hanging the second frames at different elevations.

References Cited

UNITED STATES PATENTS

| | | | |
|---|---|---|---|
| 2,580,432 | 1/1952 | Jensen | 171—5 |
| 2,893,193 | 7/1959 | Gilbert | 56—327 |
| 3,084,496 | 4/1963 | Leonard et al. | 56—327 |

HUGH R. CHAMBLEE, *Primary Examiner.*